United States Patent [19]

Shine

[11] Patent Number: 5,290,827
[45] Date of Patent: Mar. 1, 1994

[54] PRECIPITATION OF HOMOGENEOUS POLYMER MIXTURES FROM SUPERCRITICAL FLUID SOLUTIONS

[75] Inventor: Annette D. Shine, Newark, Del.

[73] Assignee: University of Delaware, Newark, Del.

[21] Appl. No.: 675,789

[22] Filed: Mar. 27, 1991

[51] Int. Cl.$^5$ ............................ C08K 5/01; C08K 5/02
[52] U.S. Cl. ............................ 523/340; 525/228; 525/227; 525/230; 525/231; 525/232; 525/233
[58] Field of Search ............... 525/228, 227, 230, 231, 525/232, 233; 523/360, 51, 340

[56] References Cited

U.S. PATENT DOCUMENTS

| | | | |
|---|---|---|---|
| 4,582,731 | 4/1986 | Smith | 427/421 |
| 4,594,371 | 6/1986 | Nauman | 523/340 |
| 4,666,961 | 5/1987 | Nauman | 523/340 |
| 4,734,451 | 3/1988 | Smith | 524/493 |
| 5,106,906 | 4/1992 | Meier et al. | 525/51 |

OTHER PUBLICATIONS

A. K. Lele, A. D. Shine, "Dissolution and Precipitation of Polymers Using a Supercritical Solvent", Polymer Preprints, vol. 31, No. 1, p. 677, Apr., 1990.
B. D. Favis and L. A. Utracki, "Polyblends-'87 Preamble", Polym. Eng. Sci. 27, 1573 (1987).
D. Braun, P. R. Kohl and G. P. Hellmann, "The Glass Transition Temperatures of Homogeneous Blends of Polystyrene, Poly(methyl methacrylate), and Copolymers of Styrene and Methyl Methacrylate", Makromol. Chem. 189, 1671 (1988).
H. H. Chuah, T. Kyu and T. E. Helminiak, "The Kinetics of Phase Separation of PBT/Nylon 66 Molecular Composite", Polym. Mater. Sci. Eng. 56, 68 (1987).
E. B. Nauman, M. V. Ariyapadi, N. P. Balsara, T. A. Grocela, J. S. Furno, S. H. Liu and R. Mallikarjun, "Compositional Quenching: A Process for Forming Polymer-in-Polymer Microdisperesions and Cocontinuous Networks", Chem. Eng. Comm. 66, 29 (1988).
A. R. Schultz and A. L. Young, "DSC on Freeze--Dried Poly(methyl methacrylate)-Polystyrene Blends", Macromolecules 13, 663 (1980).
D. W. Matson, R. C. Petersen, R. D. Smith, "Production of Powders and Films by the Rapid Expansion of Supercritical Solutions", J. Mat. Sci. 22, 1919 (1987).
L. H. Bangert, J. L. Lundberg, J. D. Muzzy, G. H. Hoyes, L. H. Olson, W. D. Freeston, "Advanced Technology Applications in Garment Processing", NSF Report RA-770428, NTIS PB 284, 779 (1977).
V. Krukonis, "Supercritical Fluid Nucleation of Difficult to Comminute Solids", presented at the AIChE Annual Meeting, San Francisco, Nov. (1984).
R. C. Peterson, D. W. Matson, R. D. Smith, "Rapid Precipitation of Low Vapor Pressure Solids from Supercritical Fluid Solutions: The Formation of Thin Films and Powders", J. Am. Chem. Soc. 108, 2100 (1986).
D. W. Matson, R. C. Peterson, R. D. Smith, "The Preparation of Polycarbosilane Powders and Fibers During Rapid Expansion of Supercritical Fluid Solutions", Mater. Lett 4 (10), 429 (1986).
R. G. Hill, P. E. Tomlins, J. S. Higgins, "A Preliminary Study of the Dynamics of Phase Separation in Oligomeric Polystyrene-Polybutadiene Blends", Polymer 26, 1708 (1986).

(List continued on next page.)

Primary Examiner—John Kight, III
Assistant Examiner—Duc Truong
Attorney, Agent, or Firm—Brahm J. Cornstanje; Rose Ann Dabek; Jerry J. Yetter

[57] ABSTRACT

Homogeneous polymer blends are prepared from otherwise thermodynamically immiscible polymers. Thus, mixtures of polymers such as poly (methyl methacrylate) and poly (ethyl methacrylate) are dissolved under pressure in supercritical fluid solvents such as chlorodifluoromethane and expanded through a fine nozzle. As the SCF solvent evaporates, the polymer mixture deposits as a substantially homogeneous blend.

8 Claims, 2 Drawing Sheets

OTHER PUBLICATIONS

C. C. Han, M. Okada, Y. Muroga, B. J. Bauer, O. Tran-Cong, "Phase Decomposition Phenomena in Polystyrene/Poly(vinyl methyl ether)", Polym. Eng. Sci. 26, 1208 (1986).

T. Hashimoto, "Structure Formation in Polymer Mixtures by Spinodal Decomposition", in Current Topics in Polymer Science, vol. II, R. M. Ottenbrite, L. A. Utracki and S. Inoue, eds., Hanser, N.Y., 199 (1987).

U. Delaware, Dept. of Chem. Eng. Research Report 1989, Apr. 4, 1990, p. 35.

PRECIPITATION OF HOMOGENEOUS POLYMER MIXTURES FROM SUPERCRITICAL FLUID SOLUTIONS

TECHNICAL FIELD

The present invention relates to the field of polymers, and encompasses new homogeneous polymer blends and methods for preparing such blends from otherwise thermodynamically immiscible mixtures of polymers.

BACKGROUND OF THE INVENTION

Polymer blends represent an important class of polymeric materials, accounting for 20% of the U.S. synthetic resin market in 1985. Although the majority of commercially important polymer blends are thermodynamically immiscible heterogeneous blends, considerable interest exists for producing miscible homogeneous blends, because such blends achieve properties intermediate to those of their constituent polymers. Commercial miscible blends are at present mainly used for their mechanical and thermal properties, but immense potential exists for the development of polymer blends with specially tailored optical, surface, barrier or biodegradation properties. In spite of much synthetic research effort, miscible polymer pairs are rare, because the high molecular weight of polymers provides little entropic driving force for miscability. Favorable enthalpic contributions, which lead to miscability, are possible only when specific interactions are present between moieties in the different polymers.

In an attempt to bypass the specific interactions requirement, researchers have studied potential techniques for producing nonequilibrium single-phase blends of thermodynamically immiscible polymers. These techniques typically involve the preparation of a dilute ternary solution of two polymers in a common liquid solvent, followed by rapid quenching of the blend into the solid state via coagulation, solvent evaporation or freeze-drying. These diffusion-governed processes are slow, as compared with incipient polymer phase separation in liquid solutions, so it is not surprising that some degree of phase separation occurs, e.g., micronsized domains are formed or extremely broad glass transition temperatures are noted.

In light of the fact that many polymers (e.g., all glassy polymers) enjoy commercial use in a thermodynamic state far removed from equilibrium, it is short-sighted to limit the search for intermediate-property polymer blends to systems that are thermodynamically miscible. For example, rapid coagulation or quenching of polymer mixtures can result in a frozen-in single phase morphology, such as that observed in molecular composites. However, coagulation and quenching techniques are governed by solvent and heat diffusion, respectively, which are typically slow processes in high molecular weight systems, and can cause an undesirable skin/core morphology.

To summarize, attempts by others to produce a homogeneous mixture of immiscible polymers or copolymers have involved processes such as solvent evaporation, coagulation, rapid freezing or freeze-drying. Each of these techniques is governed by a diffusive process, either of heat or of mass. Particularly in polymercontaining materials, diffusive processes are typically slow. The present invention produces a homogeneous mixture of immiscible polymers by density reduction of a solution whose solvent is above its critical point. The time scale of this process is governed by convection (i.e., bulk flow), not diffusion, and the characteristic convective velocity for flow of a compressible fluid such as a supercritical fluid is the speed of sound, which is quite rapid.

Producing a homogeneous mixture of immiscible polymers is of practical interest for several reasons. The vast majority of pairs of polymers are immiscible, so they separate into two different phases when they are mixed. Because of the phase separation, the immiscible mixtures are opaque and have poor mechanical properties, even to the point of having little mechanical integrity. In homogeneous miscible blends, however, transparency and good mechanical properties can be achieved. The properties are usually intermediate to the two components, so producing homogeneous mixtures of polymers offers the opportunity to achieve adjustable properties without the need for synthesizing new polymer materials.

Besides the usefulness of producing stable homogeneous polymer mixtures for the sake of their properties, it may be desirable to produce unstable homogeneous polymer mixtures that will revert in time to their thermodynamically stable, immiscible form. Since the rate of phase separation will be dependent on the environmental conditions, these materials could be used as environmental indicators, or as environmentally degradable materials.

According to the present invention, a homogeneous single-phase blend of otherwise immiscible polymers is prepared via a precipitation technique which is not limited by slow diffusion processes. The solid binary blend is precipitated by rapid pressure (density) reduction from a homogeneous ternary solution of the two polymers in a supercritical fluid (SCF) solvent. Single-phase polymer blends are produced thereby.

BACKGROUND ART

U.S. Pat. Nos. 4,594,371, Jun. 10, 1986, and 4,666,961, May 19, 1987, to E. B. Nauman, are concerned with a technique that produces a polymer mixture by rapid pressure reduction from a solution. The inventor uses elevated (albeit, rather low by the standards of the present invention) pressure in order to suppress solvent boiling when he raises the solution temperature in order to promote solvent evaporation in his low pressure chamber. However, these patents, and other journal publications which cover that process, are mainly concerned with: producing a two-phase mixture, rather than one-phase as in the present invention; a conventional incompressible liquid solvent, rather than a compressible supercritical fluid as in the present invention; solvent evaporation as the mechanism for producing the mixture, rather than density reduction as in the present invention; and a two-step process, since after the first evaporation step 30% to 60% of the remaining solution is solvent. The present invention is a one-step process that has essentially no solvent remaining after the one step.

U.S. Pat. Nos. 4,734,451, Mar. 29, 1988, and 4,582,731, Apr. 15, 1986, to Richard D. Smith, deal with the rapid expansion of supercritical fluid solutions to form thin films and fine powders of all sorts of materials. Smith makes no mention of using the technique to produce a homogeneous polymer mixture. Smith does state in the '731 patent that, "An additional object is to enable the deposition of nonequilibrium materials." The polymer mixtures produced in the present invention would be "nonequilibrium materials", as are innumerable other common materials.

A. K. Lele and A. D. Shine have published an article entitled "Dissolution and Precipitation of Polymers Using A Supercritical Solvent" in *Polymer Preprints*, Vol. 31, No. 1, page 677, April, 1990.

In addition to the foregoing, the following references relate to polymers, polymer blends, and various processes for their manufacture: B. D. Favis and L. A. Utracki, "Polyblends-'87 Preamble", Polym. Eng. Sci. 27, 1573 (1987); D. Braun, P. R. Kohl and G. P. Hellmann, "The Glass Transition Temperatures of Homogeneous Blends of Polystyrene, Poly(methyl methacrylate), and Copolymers of Styrene and Methyl Methacrylate", Makromol. Chem. 189, 1671 (1988); H. H. Chuah, T. Kyu and T. E. Helminiak, "The Kinetics of Phase Separation of PBT/Nylon 66 Molecular Composite", Polym. Mater. Sci. Eng. 56, 68 (1987). (See also references therein); E. B. Nauman, M. V. Ariyapadi, N. P. Balsara, T. A. Grocela, J. S. Furno, S. H. Liu and R. Mallikarjun, "Compositional Quenching: A Process for Forming Polymer-in-Polymer Microdispersions and Cocontinuous Networks", Chem. Eng. Comm. 66, 29 (1988. (See also references therein); A. R. Schultz and A. L. Young, "DSC on Freeze-Dried Poly(methyl methacrylate) -Polystyrene Blends", Macromolecules 13, 663 (1980); D. W. Matson, R. C. Petersen and R. D. Smith, "Production of Powders and Films by the Rapid Expansion of Supercritical Solutions", J. Mat. Sci. 22, 1919 (1987) ; L. H. Bangert, J. L. Lundberg, J. D. Muzzy, G. H. Hoyes, L. H. Olson and W. D. Freeston, "Advanced Technology Applications in Garment Processing", NSF Report RA-770428, NTIS PB 284, 779 (1977); V. Krukonis, "Supercritical Fluid Nucleation of Difficult to Comminute Solids", presented at the AIChE Annual Meeting, San Francisco, November (1984); R. C. Petersen, D. W. Matson and R. D. Smith, "Rapid Precipitation of Low Vapor Pressure Solids from Supercritical Fluid Solutions: The Formation of Thin Films and Powders", J. Am. Chem. Soc. 108, 2100 (1986); D. W. Matson, R. C. Petersen and R. D. Smith, "The Preparation of Polycarbosilane Powders and Fibers During Rapid Expansion of Supercritical Fluid Solutions", Mater. Lett. 4 (10), 429 (1986); R. G. Hill, P. E. Tomlins and J. S. Higgins, "A Preliminary Study of the Dynamics of Phase Separation in Oligomeric Polystyrene-Polybutadiene Blends", Polymer 26, 1708 (1985) ; C. C. Han, M. Okada, Y. Muroga, B. J. Bauer and Q Tran-Cong, "Phase Decomposition Phenomena in Polystyrene/Poly(vinyl methyl ether)", Polym. Eng. Sci. 26, 1208 (1986); T. Hashimoto, "Structure Formation in Polymer Mixtures by Spinodal Decomposition", in *Current Topics in Polymer Science, Volume II*, R. M. Ottenbrite, L. A. Utracki and S. Inoue, eds., Hanser, N.Y., 199 (1987); and University of Delaware, Department of Chemical Engineering Research Report 1989, published Apr. 3, 1990 at p. 35, which contains a description of Annette D. Shine's research interests, including the current invention.

SUMMARY OF THE INVENTION

This invention encompasses a new process that produces new compositions of matter, and such compositions per se. By the process herein, two or more thermodynamically immiscible polymers (by "polymers" herein is meant homopolymers or random copolymers) are dissolved in a solvent at a pressure and temperature above the solvent's critical point. The density of the solution is then rapidly lowered by reducing the pressure, such as by throttling the solution across a nozzle, capillary, orifice or valve. The polymer mixture precipitates from the solution owing to the low solubility of polymers in low density solvents. Since the density reduction is rapid, the precipitation of the polymers occurs much faster than the phase separation of the polymer constituents into their thermodynamically stable morphology occurs. Hence, the composition of matter thus produced has a metastable, homogeneous morphology.

The following considerations are essential to the practice of the invention.

1) Two or more thermodynamically immiscible polymers used herein must have appreciable ($>$ca. 0.01 wt%) solubility in a SCF solvent.

2) When the two polymers are dissolved in the SCF, they must form a single-phase solution. For most immiscible polymer pairs, this requirement is satisfied if the total polymer concentration is low enough, typically 5% or less.

3) After dissolution, the polymer/SCF solution is rapidly expanded across a small diameter nozzle. The minimum cross sectional area of the nozzle must be small enough to ensure that the flow is choked, i.e., that sonic conditions occur at the minimum area section. Typically, this condition is fulfilled when the diameter of the nozzle is less than one-half the diameter of the polymer/solvent feed tubing leading to the nozzle.

4) The final temperature of the precipitated polymer blend, which is governed by the initial temperature and pressure of the SCF solution, as well as by the pressure maintained in the precipitation enclosure, must be no more than ca. 30° C. above the glass transition temperature of the polymer mixture, and is preferably at or below the glass transition temperature, in order to freeze in the non-equilibrium homogeneous morphology of the blend.

All weights, percentages and ratios herein are by weight, unless otherwise specified.

DETAILED DESCRIPTION OF THE INVENTION

Figure 1:
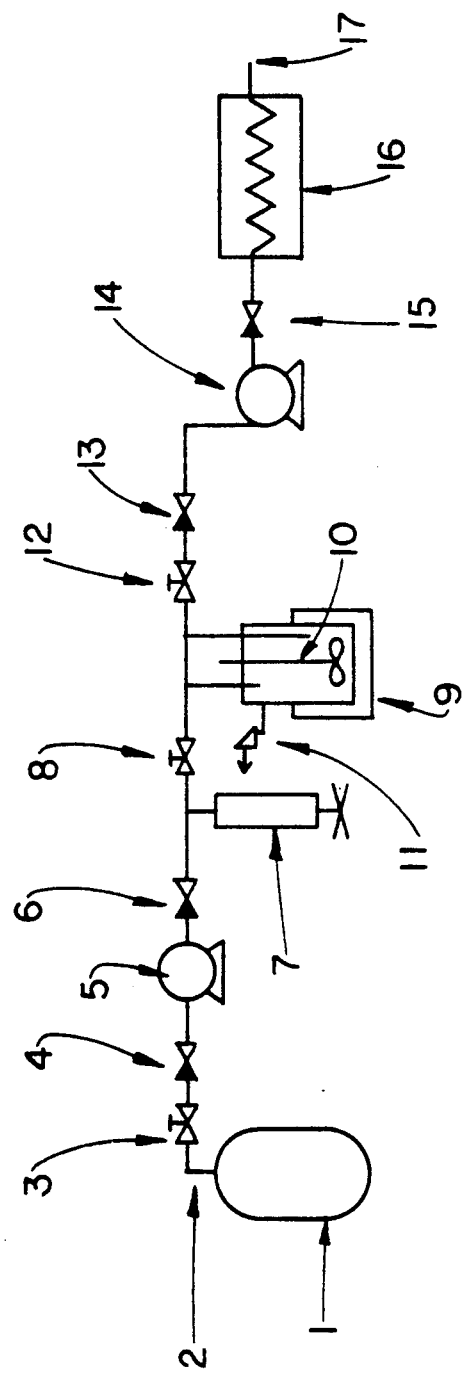
FIG. 1 is a schematic diagram of one type of equipment used for the polymer dissolution step of the present process. Solvent proceeds from the solvent reservoir (1) through feed line (2) through valve (3) and check valve (4) through pump (5) and check valve (6); thence via pressure intensifier means (7) and valve (8) into autoclave (9) containing the polymers and fitted with stirring means (10) and rupture disk (11). After dissolution of the polymer, the solvent/polymer solution proceeds through valve (12) check valve (13) pump (14) and check valve (15) into heater (16). The solvent/polymer solution then proceeds through outlet tubing (17) into the apparatus depicted in FIG. 3.

The polymers and solvent materials employed herein can be conventional materials well-known in the art. The practice of this invention allows such polymers to be blended in such a way as to form homogeneous blends in a manner not heretofore achieved. However, the following is intended to assist the formulator in the selection of polymers and solvent materials for use herein. The items listed are by way of exemplification and not by way of limitation of polymers and solvent materials useful in the practice of this invention.

Polymers—The polymer materials used in the practice of this invention are selected from materials which exhibit appreciable solubilities (generally, a solubility of at least about 0.01%, by weight, under the chosen operating conditions is preferred) in various supercritical fluid (SCF) solvents. It will be appreciated, of course, that to achieve the polymer blends in the manner of the present invention, all polymers used must be co-soluble in the SCF solvent. Preferably, the co-solubility of all polymers chosen for a given polymer blend will be at least about 0.01% by weight in the SCF in order to achieve reasonable through-put without need for a large excess of SCF. However, this is within the discretion of the formulator.

Included among polymers useful herein are: polyolefins, especially polyethylene and polypropylene; the polystyrenes; the polyamides, especially polyamides of the nylon-type; silicone polymers, especially the polydimethylsiloxanes; polyesters, especially the aliphatic polyesters; polyacrylates and polycyanoacrylates, polymethacrylates and polycyanomethacrylates; polycarbonates; poly(dienes); poly(oxides); vinyl polymers; polyurethanes; polysulfones; cellulosic polymers; polyaminoacids; polyimides, especially poly ether imides; and random copolymers containing random units of these materials as a constituent. Thus, the process herein can be used with mixtures of homopolymers, mixtures of random copolymers and mixtures of homopolymers and random copolymers. The molecular weights of the polymer species can vary, and generally range from about $10^4$ to about $2 \times 10^6$. In the practice of this invention, at least two of such polymer types are converted into homogeneous polymer blends. Typical polymer blends herein include: polystyrene/polybutadiene; poly(hydroxybutyric acid)/polycaprolactone; polystyrene/polycarbonate. It will be appreciated, moreover, that multiblend composites using three, or more, polymer types can also be prepared.

In addition, the physical properties of the polymer blends afforded by this invention can be further tailored by the selection of various weight ratios of the particular polymers chosen for use in the blends. Clearly, such matters can be left to the discretion and needs of the formulator. However, by way of example and not limitation, the following polymer blends may be mentioned (ratios listed are by weight): polystyrene/polybutadiene (85:15); polycaprolactone/polylactide (90:10 to 10:90); and nylon/polycarbonate (75:25).

Solvents—The materials useful as solvents herein are those which have now become widely recognized as "Supercritical Fluid" (SCF) solvents. In general, such materials are characterized by their enhanced solubilizing properties for solutes, including polymers, at high pressures. Nonlimiting examples of SCF's useful herein include a rather diverse array of chemical species, including, but not limited to: $CO_2$ (liquified); $N_2O$; chlorofluorocarbons; hydrochlorofluorocarbons, especially chlorodifluoromethane (DuPont; as Freon 22) and dichlorotrifluoroethane (DuPont HCFC 123 and 123a); low molecular weight alkanes, especially n-butane, propane and ethane; low molecular weight alkenes, especially ethylene; ammonia (liquefied); alcohols such as methanol and ethanol; water; ethers such as diethyl ether; aromatic hydrocarbons such as toluene; pyridine; and the like. Mixtures of solvents may also be used. Standard references list additional SCF'S. Convenient SCF solvents include chlorodifluoromethane, liquefied $CO_2$, $N_2O$ and $C_2$-$C_4$ alkanes. In any event, the formulator has the option to select from a wide variety of individual SCF's or mixtures to achieve co-solubility of the selected polymers, as noted above.

Optional Ingredients—The homogeneous polymer blend described in this invention may also, optionally, be prepared with conventional polymer additives such as stabilizers, colorants, flame retardants, antioxidants, antistatic agents, antimicrobial agents or crosslinking agents. Such ingredients typically comprise from about 0.01% to about 2% by weight of the final polymer blend.

Processing Conditions—The process herein is typically carried out at pressures from about 2,000 psi to about 10,000 psi. Temperature ranges are typically 30° C.–150° C. It will be appreciated that these pressures and temperatures can be varied according to the specific SCF chosen, the specific polymers chosen and the equipment available to the formulator. Total solids content (i.e., polymer content) in the SCF is generally 5% (wt.) or less. The system can be operated in a continuous mode with liquid from rates ranging from 46 to 460 ml/hr.

Reference is made to the schematic diagrams (FIGS. 1 and 2) of the equipment used in the dissolution step of the present process. Depending on the solubility characteristics of the polymers used, the dissolution step is conducted in one of two different ways, shown in FIG. 1 and FIG. 2, respectively. For two or more polymers having vastly different equilibrium solubilities in the SCF solvent, or for polymers with high (>5%) individual solubility, the apparatus in FIG. 1 is preferred. Solvent from a solvent reservoir is fed through a pump (Milton Roy, Model 92015003) and pressure intensifier (HIP Model) to a heated autoclave (Fluitron 300cc Model) containing the polymers to be dissolved. The autoclave is stirred until the polymers dissolve completely; the autoclave pressure typically ranges from atmospheric pressure to 10,000 psi. The polymer solution is pumped from the autoclave using a high pressure pump (Ruska), and may be heated by passing the solution through stainless steel tubing wrapped with a heating tape (Thermodyne Model BIHO51020).

Figure 2:
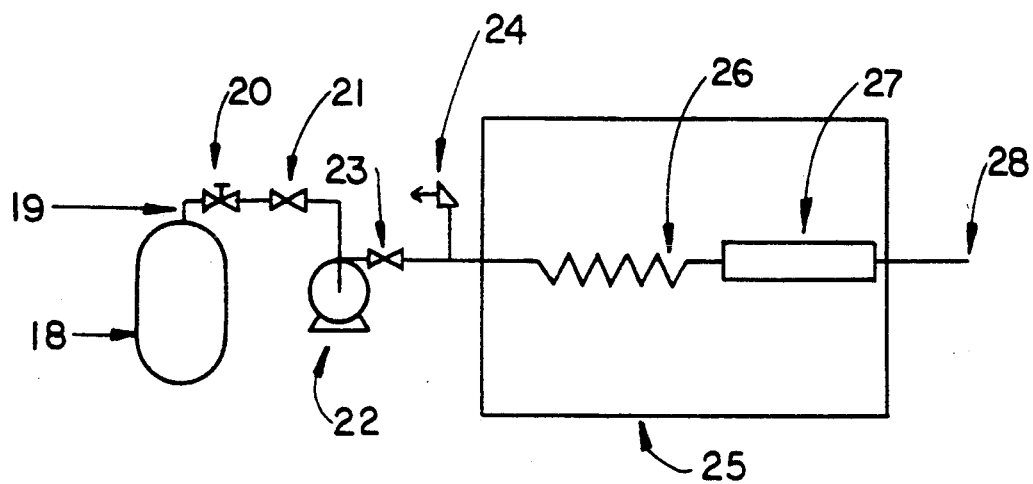
FIG. 2 is a schematic diagram of a second type of equipment used for the polymer dissolution step of the present process. Solvent proceeds from the solvent reservoir (18) through feed line (19) valve (20) check valve (21) pump (22) check valve (23) and into the oven assembly (25) which is fitted with rupture disk (24) preheater (26) and extraction column (27) containing the polymers. The solvent/polymer solution proceeds through outlet tubing (28) into the apparatus depicted in FIG. (3).

For polymers with similar equilibrium solubility in the SCF solvent, use of the simpler apparatus shown in FIG. 2 is preferred for the dissolution step. In this process, the solvent is fed from solvent storage reservoir via minipump (Milton Roy, Model 92015003) and pressurized to a pressure typically in the range of about 1,400 to 6,000 psi. The pressurized solvent is passed through a 3 foot length of stainless steel tubing, which serves as a preheater, and then through a stainless steel extraction column which is packed with 3 mm glass beads and outfitted on the downstream end with a plug of glass wool acting as a filter. The polymers are coated onto the glass beads from the molten state or from solution before the beads are placed in the extraction column. Preheater and extraction column are enclosed in an oven (Precision Scientific, Model 28) which provides isothermal operating conditions up to 225° C. When the solvent stream contacts the polymers in the extraction column, the polymers dissolve in the solvent stream.

Figure 3:
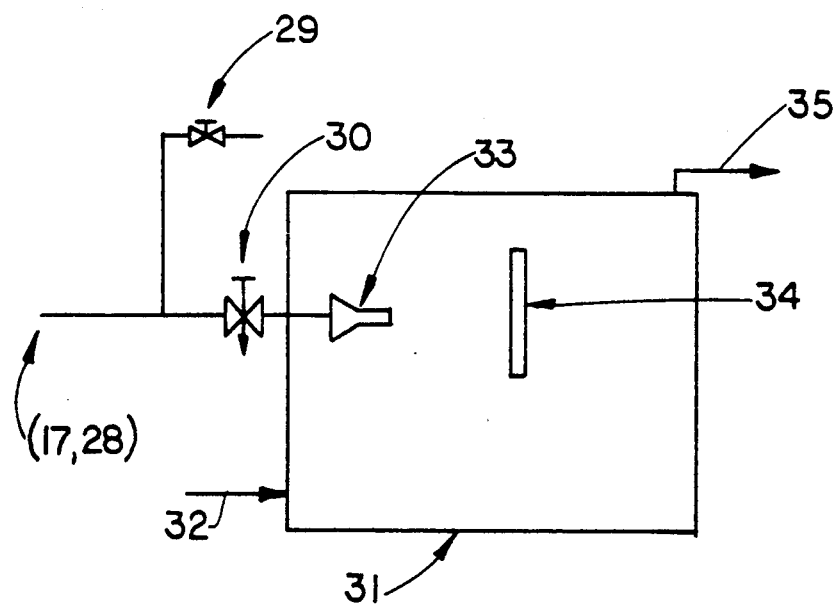
FIG. 3 is a schematic diagram of the polymer precipitation apparatus with polymer collecting means of the type conveniently used in the present process. Solvent-/polymer solution proceeds from the equipment depicted in FIG. 1 or FIG. 2 via line (17, 28) through metering valve (30). The line is fitted with venting valve (29). The solution proceeds into enclosure (31) fitted with inert purge gas inlet (32) and solvent recovery outlet (35). The solvent/polymer solution is sprayed through nozzle (33) to impinge on collection surface (34).

After the polymers have been dissolved in the SCF solvent, using either the apparatus shown in FIG. 1 or 2, the polymer solution is transferred to the precipitation apparatus shown in FIG. 3. The solution passes through a metering valve to an outlet nozzle consisting of a stainless steel disk (0.25 in. diameter, 0.01 in. thick) with a fine diameter hole (15 to 100 micrometers) through its center (Advanced Laser Systems, Waltham, Mass.). All pressurized tubing is 0.109 in. I.D. The outlet tubing leading to the nozzle is heated with a heating tape (not shown in the Figure; Thermodyne Model BIHO5120) so that the cooling effect of the expansion process does not cause premature precipitation and plugging of the fine diameter nozzle. The precipitated sample is collected on the collecting surface—typically, glass slides or rotating cylinders can be used. The sample may also be collected on a filter or filter bag. The nozzle and collecting surface are contained in an enclosure that is typically maintained at atmospheric conditions, but may be kept under vacuum or elevated pressure. If flammable solvents are used in the process, it is preferred to keep a constant stream of an inert gas, such as nitrogen, flowing through the enclosure. After polymer precipitation, the solvent is recovered by condensation or compression, and may be reused in the dissolution step.

The following Example further illustrates the practice of this invention, but is not intended to be limiting thereof.

EXAMPLE I

Using the dissolution apparatus described in FIG. 2 and the precipitation apparatus described in FIG. 3, a homogeneous mixture of a poly (ethyl methacrylate) homopolymer/poly(methyl methacrylate) homopolymer (1:1 ratio) is prepared in chlorodifluoromethane at a pressure above 2000 psi. Total solids concentration in the chlorodifluoromethane is below 1%, to ensure that a single phase mixture is formed. The temperature of the oven and the outlet tubing is ca. 110° C. Throttling the mixture through the 30 micrometer nozzle onto the collecting surface results in the formation of a homogeneous polymer composition in the form of a fine powder.

It will be appreciated that the aforesaid disclosures regarding the processes and polymers made therefrom represent typical embodiments of the present invention, but that other embodiments fall within the ambit of the invention without departing from the scope thereof.

What is claimed is:

1. A process for preparing a homogeneous blend of otherwise thermodynamically immiscible polymers, comprising:
   a) preparing a solution of said polymers in a supercritical fluid solvent to form a single-phase solution blend;
   b) rapidly expanding the solution from step (a) across a small diameter nozzle; and
   c) removing said supercritical fluid solvent to precipitate the solid polymer blend at a final temperature which is no more than about 30° C. above the glass transition temperature of the polymer blend, whereby, the non-equilibrium homogeneous morphology of the blend is maintained.

2. A process according to claim 1 wherein the solubility of the polymers in the supercritical fluid solvent is at least about 0.01% by weight.

3. A process according to claim 1 wherein the concentration of the polymers in the supercritical fluid is less than about 5% by weight.

4. A process according to claim 1 wherein the supercritical fluid solvent is a member selected from the group consisting of chlorodifluoromethane, liquefied $CO_2$, $N_2O$, and $C_2$–$C_4$ alkanes.

5. A process according to claim 1 wherein the polymer blend comprises two or more otherwise thermodynamically immiscible polymers selected from the group consisting of polyolefins; the polystyrenes; the polyamides; silicone polymers; polyesters; polyacrylates; polycyanoacrylates; polymethacrylates; polycyanomethacrylates; polycarbonates; poly(dienes); poly(oxides); vinyl polymers; polyurethanes; polysulfones; cellulosic polymers; polyaminoacids; polyimides; and random copolymers thereof.

6. A process according to claim 1 which is carried out at a pressure from about 2000 psi to about 10,000 psi and at a temperature from about 30° C. to about 150° C.

7. A process according to claim 1 wherein the polymer blend comprises poly (methyl methacrylate) and poly (ethyl methacrylate) and the supercritical fluid solvent is chlorodifluoromethane.

8. A homogeneous blend of polymers prepared according to claim 1.

* * * * *